United States Patent
Pause

(10) Patent No.: US 7,913,685 B2
(45) Date of Patent: Mar. 29, 2011

(54) TEXTILE HEAT ACCUMULATOR FOR UTILIZATION OF SOLAR ENERGY

(76) Inventor: Barbara Hildegard Pause, Longmont, CO (US)

( * ) Notice: Subject to any disclaimer, the term of this patent is extended or adjusted under 35 U.S.C. 154(b) by 1176 days.

(21) Appl. No.: 11/418,530

(22) Filed: May 3, 2006

(65) Prior Publication Data

US 2006/0260496 A1    Nov. 23, 2006

Related U.S. Application Data

(60) Provisional application No. 60/682,520, filed on May 18, 2005.

(51) Int. Cl.
 *F24H 7/00* (2006.01)
 *F24J 3/02* (2006.01)
 *F28D 21/00* (2006.01)

(52) U.S. Cl. ........ 126/618; 126/569; 126/615; 126/617; 126/621; 126/663

(58) Field of Classification Search .......... 126/569, 126/572, 585, 610, 615, 617–619, 621, 624, 126/626, 634, 640, 642, 646, 663, 710–712, 126/713; *F24J 3/02; F24H 7/00; F28D 21/00*
See application file for complete search history.

(56) References Cited

U.S. PATENT DOCUMENTS

| | | | | |
|---|---|---|---|---|
| 1,888,620 A | * | 11/1932 | Clark | 126/640 |
| 3,000,375 A | * | 9/1961 | Golay | 126/569 |
| 3,254,643 A | * | 6/1966 | Thomason | 126/572 |
| 3,780,262 A | * | 12/1973 | Rudd | 392/339 |
| 4,062,346 A | * | 12/1977 | Rapp et al. | 126/649 |
| 4,095,118 A | * | 6/1978 | Rathbun | 290/2 |
| 4,111,189 A | * | 9/1978 | Dizon | 126/400 |
| 4,131,158 A | * | 12/1978 | Abhat et al. | 165/104.14 |
| 4,169,460 A | * | 10/1979 | Popovich et al. | 126/589 |
| 4,171,619 A | * | 10/1979 | Clark | 62/235.1 |
| 4,257,398 A | * | 3/1981 | Watson | 126/612 |
| 4,263,961 A | * | 4/1981 | Morawetz et al. | 165/111 |
| 4,280,333 A | * | 7/1981 | Corliss et al. | 62/259.1 |
| 4,396,690 A | * | 8/1983 | Gordon et al. | 429/111 |
| 4,617,332 A | * | 10/1986 | Salyer et al. | 524/4 |
| 4,671,077 A | * | 6/1987 | Paradis | 62/324.1 |
| 4,797,160 A | * | 1/1989 | Salyer | 106/660 |
| RE34,880 E | * | 3/1995 | Salyer | 106/660 |
| 7,028,685 B1 | * | 4/2006 | Krecke | 126/633 |
| 7,299,591 B2 | * | 11/2007 | Broatch | 52/173.3 |
| 7,678,991 B2 | * | 3/2010 | McCaskill et al. | 136/244 |
| 2001/0027804 A1 | * | 10/2001 | Inoue et al. | 136/256 |
| 2002/0117166 A1 | * | 8/2002 | Okumura | 126/633 |
| 2003/0037907 A1 | * | 2/2003 | Lee | 165/104.19 |

FOREIGN PATENT DOCUMENTS

| | | | |
|---|---|---|---|
| JP | 09003847 A | * | 1/1997 |
| WO | WO 9947865 A1 | * | 9/1999 |

* cited by examiner

*Primary Examiner* — Carl D Price
*Assistant Examiner* — Daniel E Namay

(57) ABSTRACT

The invention relates to a textile heat accumulator consisting of a textile carrier material to which a plurality of thin capillaries for water transportation are attached and which is coated with an elastomeric compound comprising finely divided phase change materials such as salt hydrates or crystalline alkyl hydrocarbons. The textile heat accumulator arranged in a roofing structure of a building facilitates the control of the heat flux into the building and the utilization of the latent heat stored within phase change material for hot water generation.

7 Claims, 1 Drawing Sheet

TEXTILE HEAT ACCUMULATOR FOR UTILIZATION OF SOLAR ENERGY

CROSS-REFERENCES TO RELATED APPLICATIONS

This application claims priority of U.S. Provisional Patent Application Ser. No. 60/682,520 filed May 18, 2005 entitled "Utilization of solar energy with textile heat accumulators".

BACKGROUND OF THE INVENTION

The worldwide increase in energy demands, the constant rise in energy prices and concerns of environmental damages caused by the increased use of fossil energy resources drives the demand for energy conservation and the use of renewable energies. The problem can be solved by the implication of textile heat accumulators based on the application of phase change material and used for hot water supply.

Phase change material is a highly-productive thermal storage medium which possesses the ability to change its physical state within a certain temperature range. When the melting temperature is obtained during a heating process, the phase change from the solid to the liquid state occurs. During this melting process, the phase change material absorbs and stores a large amount of latent heat. The temperature of the phase change material remains nearly constant during the entire process. When the phase change is complete, a continuing heating process leads to a further temperature increase and the absorption of a much smaller amount of sensible heat. In a cooling process of the phase change material, the stored latent heat is released into the environment in a certain temperature range, and a reverse phase change from the liquid to the solid state takes place. During this crystallization process, the temperature of the phase change material also remains constant. The high heat transfer during the melting process and the crystallization process, both without any temperature change, is responsible for the phase change material's appeal as a source of heat storage.

In order to contrast the amount of latent heat absorbed by a phase change material during the actual phase change with the amount of sensible heat absorbed in an ordinary heating process, the ice-water phase change process will be used. When ice melts, it absorbs an amount of latent heat of about 335 J/g. When the water is further heated, it absorbs a sensible heat of only 4 J/g while its temperature rises by one degree C. Thus, water needs to be heated as long as its temperature rises from 1° C. to about 84° C. in order to absorb the same amount of heat which is absorbed during the melting process of ice.

In addition to ice (water), more than 500 natural and synthetic phase change materials are known. These materials differ from one another in their phase change temperature ranges and their latent heat storage capacities.

Currently, crystalline alkyl hydrocarbon phase change materials having different chain lengths are used in textile applications and more specifically in garment applications. Characteristics of these phase change materials are summarized in Table 1.

TABLE 1

| Crystalline alkyl hydrocarbons | | | | |
|---|---|---|---|---|
| Crystalline alkyl hydrocarbons | Formula | Melting temperature, ° C. | Crystallization temperature, ° C. | Latent heat storage capacity, J/g |
| Heneicosane | $C_{21}H_{44}$ | 40.5 | 35.9 | 213 |
| Eicosane | $C_{20}H_{42}$ | 36.1 | 30.6 | 247 |
| Nonadecane | $C_{19}H_{40}$ | 32.1 | 26.4 | 222 |
| Octadecane | $C_{18}H_{38}$ | 28.2 | 25.4 | 244 |
| Heptadecane | $C_{17}H_{36}$ | 21.7 | 16.5 | 213 |
| Hexadecane | $C_{16}H_{34}$ | 16.7 | 12.2 | 237 |

The crystalline alkyl hydrocarbons are either used in technical grades with a purity of approximately 95%; or they are blended with one another in order to cover specific phase change temperature ranges. The crystalline alkyl hydrocarbons are nontoxic, non-corrosive, and non-hygroscopic. The thermal behavior of these phase change materials remains stable under permanent use. Crystalline alkyl hydrocarbons are byproducts of petroleum refining and, therefore, inexpensive. A disadvantage of crystalline alkyl hydrocarbons is their low resistance against ignition.

Salt hydrates are alloys of inorganic salts and water. The most attractive properties of salt hydrates are the comparatively high latent heat storage capacities, the high thermal conductivities and the small volume change during melting. They are mostly non-combustible which makes them specifically attractive for building applications. Salt hydrates often show an incongruent melting behaviour as a result of a lack in reversible melting and freezing making them unsuitable for permanent use. Salt hydrates with reversible melting and freezing characteristics are summarized in Table 2.

TABLE 2

| Salt hydrates | | |
|---|---|---|
| Salt hydrates | Melting temperature, ° C. | Latent heat storage capacity, J/g |
| Calcium cloride hexahydrate | 29.4 | 170 |
| Lithium nitrate trihydrate | 29.9 | 296 |
| Sodium hydrogen phosphate dodecahydrate | 36.0 | 280 |
| Sodium thiosulfate pentahydrate | 49.0 | 200 |
| Lithium acetate dihydrate | 56.0 | 270 |
| Magnesium cloride tetrahydrate | 58.0 | 180 |

Phase change materials have been suggested for the use in solar energy systems. For instance, U.S. Pat. No. 5,269,851 describes a solar energy system where phase change material is used to protect photovoltaic cells from excessive temperatures.

U.S. Pat. No. 5,505,788 reports a photovoltaic roofing assembly where phase change material is used for temperature regulation.

Furthermore, phase change material is used for intermediate heat storage in a water heating unit described in U.S. Pat. No. 6,047,106.

SUMMARY OF THE INVENTION

The invention pertains to a textile heat accumulator consisting of a textile composite with incorporated phase change material which is suitable for energy storage as well as hot water generation. The textile heat accumulator is preferably used in roofs of residential or commercial buildings. In its building application, the textile heat accumulator controls the heat flux into the building. In addition, the latent heat stored in the phase change material during the day is used for hot water supply. The phase change material is integrated into an elastomeric compound which is applied to a carrier fabric in form of a coating. The textile carrier is equipped with capillary pipes which are used for water transportation. In order to use the stored latent heat, cold water is pumped through the capillaries. The water absorbs the latent heat stored in the phase change material, heats up and can be used as hot water. The textile composite replaces the heat storage unit of common thermal solar energy systems. Comparing the proposed system to the common thermal solar systems, the proposed system is less expensive and does not require a lot of space. Furthermore, by recharging the phase change material during the day, the thermal performance of the phase change material is enhanced significantly.

In a preferred embodiment of the technique of the present invention, the phase change materials are non-combustible salt hydrates which allows them to meet fire-resistance requirements of building materials.

DETAILED DESCRIPTION OF THE INVENTION

Figure 1:
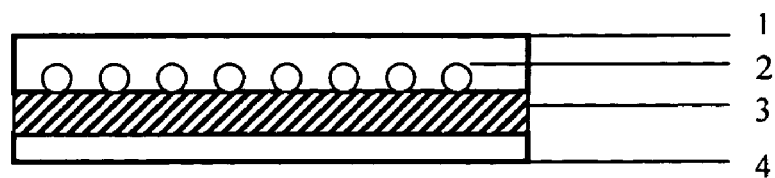
FIG. 1 is a sectional view of the textile heat accumulator.

In accordance with the present application, and with reference to FIG. 1 the textile heat accumulator of the present invention includes a first layer (1), a second layer (3) and a third layer (4). The first layer is an elastomeric coating compound comprising finely divided phase change materials. The second layer is a fabric which has capillary pipes (2) attached to one of its sides. The third layer is another coating compound which does not include phase change material.

In a preferred embodiment of the textile heat accumulator, the phase change material used within absorbs latent heat when its temperature rises above 55° C.

Most preferably, the phase change material used in the textile heat accumulator is a non-combustible salt hydrate. Using a non-combustible salt hydrate in the technique of the present invention allows for compliance with fire-resistance requirements of building materials. For instance, lithium acetate dihydrate and magnesium cloride tetrahydrate are suitable phase change materials for an application in the textile heat accumulator.

Crystalline alkyl hydrocarbons might be used in the technique of the present invention in conjunction with flame-retardant additives. For instance, mixtures of tetracosane and hexacosane are suitable crystalline alkyl hydrocarbons phase change materials for an application in the textile heat accumulator.

The selected salt hydrate or crystalline alkyl hydrocarbon can be durably contained in an elastomer whereby the phase change materials are cross-linked into the elastomer's structure. Finely-divided phase change materials emulsified or dispersed in the elastomer's structure do not flow out of the elastomer structure while in a liquid stage. The composition remains stable under substantial temperature variation over a long service life.

Such elastomeric materials can comprise, by way of example and not by limitation silicone rubber, acrylate rubber, butyl rubber, nitrile rubber or chloroprene rubber. Furthermore, thermoplastic elastomers with, for instance, fluorine, polyurethane or polyester as basic components are also suitable containment structures for the phase change material application.

In the manufacturing of the textile heat accumulator with incorporated phase change material, the phase change material is thoroughly mixed into the components creating the elastomeric matrix. Then, the elastomeric compound with the phase change material incorporated therein can be topically applied to the carrier fabric by knife coating; and there, the system will be cured. The phase change materials may be incorporated into the elastomeric matrix in a weight portion of up to 60 wt. % based on the material's total weight.

Most preferably, the carrier fabric used in the textile heat accumulator arrangement consists of a spacer fabric, a woven fabric, a non-woven fabric or a knitted fabric. The carrier fabric provides mechanical stability to the composite and creates a carrier for the elastomeric coating compound with the incorporated phase change material. Capillary pipes are attached to one side of the fabrics surface's and fixed thereof. The pipes are arranged on the fabric surface in a parallel structure with a given distance between each other. For instance, an area of 1 m$^2$ contains about 80 pipes with diameters of about three millimetres. The elastomeric compound with the phase change material is applied to the fabric's surface to which the pipes are attached to. It surrounds the capillary pipes completely, i.e. the pipes are embedded in the elastomeric compound. However, the pipe openings on the two small sides of the fabric are open so that water can flow through the pipes. The back side of the carrier fabric is covered with a coating layer which does not contain phase change material, in order to protect the surface against mechanical distraction and moisture.

In a preferred embodiment of the present invention, the textile heat accumulator possesses a weight of about 5000 g/m$^2$ and a thickness of about 8 millimetres. The latent heat storage capacity of the textile heat accumulator totals about 1000 kJ/m$^2$.

Figure 2:
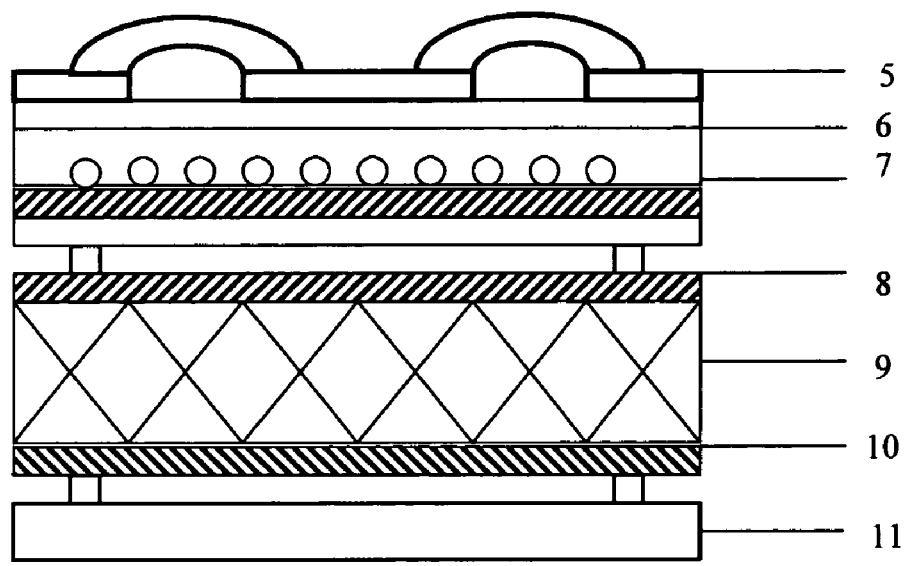
FIG. 2 is a sectional view of a roof structure which contains the textile heat accumulator.

The textile heat accumulator is used in roofs of residential and commercial buildings. FIG. 2 shows a sectional view of a common roof structure where the textile heat accumulator is arranged in its upper part. The preferable arrangement of the textile heat accumulator (7) in a roof of a building is below the roof tiles (5) mounted on the wooden boarding (6) and above the thermal insulation package consisting of the underlay (8), the thermal insulation layer (9) and the water vapor barrier (10) as well as the dry wall (11). In this arrangement, it can be expected that the temperature of the phase change material and the surrounding elastomeric compound will increase to values during the day at which the latent heat absorption takes place. The space between the textile heat accumulator and the insulation package ensures an air and moisture transfer required for such roof constructions.

It has been discovered that the incorporation of temperature stabilizing phase change material in roof structures of buildings can improve the thermal performance of residential and commercial buildings significantly. In the invented technique, the phase change material shall provide a thermal control mechanism of the heat flux into the building through the roof components. For instance, the phase change material shall absorb part of the heat provided by the solar radiation during the day. The heat absorption by the phase change material reduces the heat flux into the building. Especially on hot summer days, the thermal comfort inside the building will be enhanced significantly as a result of the phase change material's heat absorption feature. As a result of the thermal control mechanism provided by the phase change material, air-conditioning demands of the facility will be reduced and, therefore, the building becomes more energy efficient.

However, in addition to the described thermal effect the latent heat stored in the phase change material can be used to generate hot water in a way which is similar to those of a solar hot water system. Under these circumstances, the phase change material will be recharged during the day instead of overnight which makes the heat absorption feature of the phase change material even more efficient. As a result of the recharge, the latent heat absorption process of the phase change material will occur more than once during the day.

Figure 3:
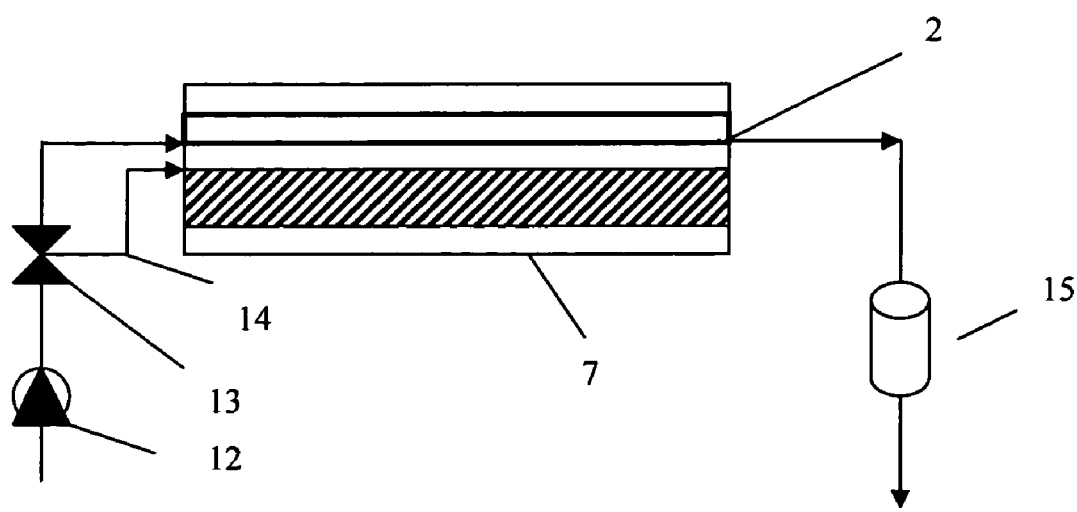
FIG. 3 is a schematic diagram of a hot water generation embodiment where the textile heat accumulator represents the storage unit.

Starting in the morning, the phase change material integrated in the textile heat accumulator will absorb latent heat as soon as the materials temperature exceeds a certain value. During the latent heat absorption, the phase change material's temperature will stay nearly constant. When all of the phase change material is melted, its temperature will rise further. A temperature sensor (14) integrated in the textile heat accumulator (7) unit shown in FIG. 3 will measure the temperature development. The temperature measurement delivers an indication at which point the phase change material is ready for a recharge., i.e. when the temperature exceeds a certain value, the sensor provides a signal to the valve (13) which normally shuts off the cold water supply. The valve opens and cold water with a temperature of about 15° C. is transported though pipes by means of the pump (12) and further through the capillary pipes (2) which are integrated into the textile heat accumulator. Because of the high temperature gradient between the phase change material's temperature of about 65° C. and the water temperature of about 15° C. at the beginning, there is a fast transfer of the latent heat stored in the phase change material to the water and the water is heated. The water which flows out of the textile heat accumulator possess a temperature of about 45° C. The hot water can be used immediately or stored in a small tank (15) to be used at a later time. Beside the possibility of an automated recharge of the phase change material if the temperature exceeds a given value, there is also the opportunity to store the latent heat over such a period of time until a hot water supply is actually required. That way, the cold water valve needs to be opened manually.

For instance, the latent heat storage capacity of 1000 kJ stored in a textile heat accumulator with a size of 1 m$^2$ is sufficient to heat up about 8 liters of water from 15° C. to 45° C. in one recharge. A total textile heat accumulator size of 6 m$^2$ already delivers the daily water supply demand for one person in a single recharge. It has to be considered that there are multiple recharges possible during the day.

A common solar hot water system consists of a solar collector and a large storage tank with a heat exchanger attached to it. A heat transfer fluid is pumped through the solar collector where it is heated. The heat transport fluid is further pumped into the storage tank and through the heat exchanger where the cold water on the bottom of the tank is heated up. The warmer water then rises to the top of the storage tank.

In comparison to the common solar hot water system, the textile heat accumulator system does not require a large storage tank with a heat exchanger. The heat exchange takes place in the textile heat accumulator itself and the recharge can be carried out several times during the day. The omission of storage tank, heat exchanger and heat exchange fluid leads to substantial savings in costs and space. In addition, the textile heat accumulator is essential cheaper than the solar collector of a common solar hot water system. The textile heat accumulator is comparatively light, thin and flexible.

In addition to roofs of residential and commercial buildings, the textile heat accumulator is also suitable for an application in the roof of a greenhouse. Furthermore, the textile heat accumulator can be applied to a membrane roof construction.

Preferred embodiments of the present invention have been described with a degree of particularity. It should be understood that this description has been made by way of preferred example, and that the invention is defined by the scope of the claims.

What is claimed is:

1. A textile heat accumulator article, consisting of:
    a first layer comprising a continuous layer of an elastomeric coating compound having a finely-divided solid-liquid phase change material dispersed therein;
    a second layer comprising a fabric wherein capillary pipes are attached to one surface of the fabric and fixed thereon, and wherein the capillary pipes are arranged parallel to the first layer:
    a third layer comprising a coating compound which does not include phase change material;
    and wherein the elastomeric coating compound with the finely-divided phase change material which creates the first layer covers the capillary pipes attached to the fabric which creates the second layer completely.

2. The article according to claim 1, which is arranged inside a roof of a building between roof tiles and thermal insulation where the first layer of the article is facing the roof tiles and the third layer of the article is facing the thermal insulation.

3. The article according to claim 1, wherein the phase change material is a salt hydrate.

4. The article according to claim 1, wherein the phase change material is a crystalline alkyl hydrocarbon.

5. The article according to claim 1, wherein the elastomeric coating compound comprises phase change material in a quantity of up to 60 wt.%, based on the total weight of the polymeric compound.

6. The article according to claim 1, wherein the phase change material has a melting point between 40° C. and 70° C.

7. A hot water generation system for converting latent heat stored within phase change material into hot water supply, comprising:
    the textile heat accumulator according to claim 1;
    a temperature sensor attached to the textile heat accumulator which measures the temperature of the phase change material;
    a piping system with a pump and a valve for providing a continuous transfer of cold water into the textile heat accumulator after the valve opens and which is connected to the capillary pipes of the textile heat accumulator;
    a piping system for the hot water transfer out of the textile heat accumulator which is connected to the capillary pipes of the textile heat accumulator;
    a tank for intermediate storage of the generated hot water.

* * * * *